(12) United States Patent
Reddy et al.

(10) Patent No.: US 6,968,996 B2
(45) Date of Patent: *Nov. 29, 2005

(54) PROTECTED CONTENT DISTRIBUTION SYSTEM

(75) Inventors: Karimireddy Hari Reddy, Potomac, MD (US); Guillermo Lao, Torrance, CA (US); Andrej Budo-Marek, Duesseldorf (DE)

(73) Assignee: ContentGuard Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/919,394

(22) Filed: Aug. 17, 2004

(65) Prior Publication Data

US 2005/0011947 A1 Jan. 20, 2005

Related U.S. Application Data

(63) Continuation of application No. 10/163,632, filed on Jun. 7, 2002, now Pat. No. 6,824,051.

(60) Provisional application No. 60/296,116, filed on Jun. 7, 2001, provisional application No. 60/296,113, filed on Jun. 7, 2001, provisional application No. 60/296,117, filed on Jun. 7, 2001.

(51) Int. Cl.[7] .............................................. G06K 5/00
(52) U.S. Cl. ..................... 235/380; 235/382; 235/382.5
(58) Field of Search ............................... 235/380, 382, 235/382.5

(56) References Cited

U.S. PATENT DOCUMENTS 6,268,788 B1 * 7/2001 Gray .......................... 340/5.2
6,824,051 B2 * 11/2004 Reddy et al. ............... 235/380

* cited by examiner

*Primary Examiner*—Karl D. Frech
(74) *Attorney, Agent, or Firm*—Marc S. Kaufman; Nixon Peabody, LLP

(57) ABSTRACT

A rights management system, method and device for managing use of items having usage rights associated therewith by enforcement of the usage rights with repositories, including a client device adapted to request an item and receive the item and a usage right associated with the item and specifying a permitted manner of use of the item; and a server device adapted to send the item and the associated usage right to the client device in response to the request. The client device includes means for establishing a communication between the client device and a third party entity associated with the rights management system based on a received item and associated usage right.

21 Claims, 6 Drawing Sheets

PROTECTED CONTENT DISTRIBUTION SYSTEM

RELATED APPLICATION DATA

This application is a continuation application of U.S. patent application Ser. No. 10,163,632 filed Jun. 7, 2002, now U.S. Pat. No. 6,824,051, which claims benefit from U.S. provisional applications Ser. No. 60/296,116 filed on Jun. 7, 2001, Ser. No. 60/296,113 filed Jun. 7, 2001, and Ser. No. 60/296,117 filed Jun. 7, 2001, the entire disclosures of all of which are hereby incorporated by reference herein.

BACKGROUND OF THE INVENTION

1. Field of the Invention

The present invention is directed to digital rights management systems for controlling the distribution of items, such as digital content. In particular, the present invention is directed to such systems that distribute content to specified end users.

2. Description of Related Art

One of the most important issues impeding the widespread distribution of digital works (i.e. documents or other content in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management (DRM)" herein. There are a number of issues to be considered in effecting a DRM system. For example, authentication, authorization, accounting, payment and financial clearing, rights specification, rights verification, rights enforcement, and document protection issues should be addressed. U.S. Pat. Nos. 5,530,235, 5,634,012, 5,715,403, 5,638,443, and 5,629,980, the disclosures of which are incorporated herein by reference, disclose DRM systems addressing these issues.

In the world of printed documents and other physical content, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital works with high quality. Accordingly, mechanisms of protecting digital works are necessary to retain rights of the owner of the work.

Unfortunately, it has been widely recognized that it is difficult to prevent, or even deter, people from making unauthorized copies of electronic works within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of high band-width "broadband" communications technologies and the development of what is presently known as the "National Information Infrastructure" (NII) will render it even more convenient to distribute large documents electronically, including video files such as full length motion pictures, and thus will remove any remaining deterrents to unauthorized copying and distribution of digital works. Accordingly, DRM technologies are becoming a high priority.

Two basic DRM schemes have been employed, secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as CRYPTOLOPES™ and DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems, such as PC's and workstations using browsers to access the Web, will be the dominant systems used to access digital works. In this sense, existing computing environments such as PC's and workstations equipped with popular operating systems (e.g., Windows™, Linux™, and UNIX) and rendering applications, such as browsers, are not trusted systems and cannot be made trusted without significantly altering their architectures. Of course, alteration of the architecture defeats a primary purpose of the Web, i.e. flexibility and compatibility.

U.S. Pat. No. 5,634,012, the disclosure of which is incorporated herein by reference, discloses a system for controlling the distribution of digital documents. Each rendering device has a repository associated therewith. A predetermined set of usage transaction steps define a protocol used by the repositories for enforcing usage rights associated with a document. Usage rights persist with the document content. The usage rights can permit various manners of use such as, viewing only, use once, distribution, and the like. Usage rights can be contingent on payment or other conditions.

SUMMARY OF THE INVENTION

Exemplary aspects of the invention include a rights management system, method and device for managing use of items having usage rights associated therewith by enforcement of the usage rights with repositories, including a client device adapted to request an item and receive the item and a usage right associated with the item and specifying a permitted manner of use of the item; and a server device adapted to send the item and the associated usage right to the client device in response to the request. The client device includes means for establishing a communication between the client device and a third party entity associated with the rights management system based on a received item and associated usage right.

DETAILED DESCRIPTION OF THE PREFERRED EMBODIMENT

Figure 1:
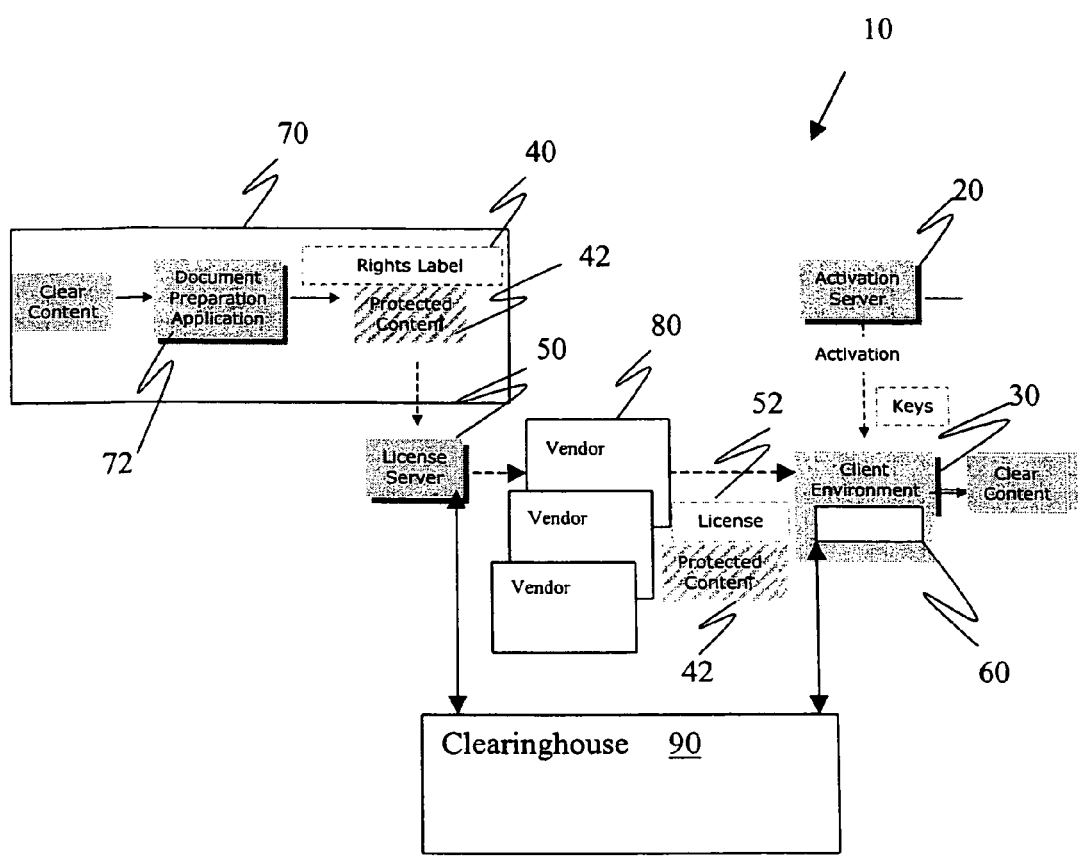
FIG. 1 is a schematic illustration of a DRM system.

A DRM system can be utilized to specify and enforce usage rights for specific content or other items. FIG. 1 illustrates a DRM system 10 that can be used to distribute digital content. DRM system 10 includes a user activation device, in the form of activation server 20, that issues public and private key pairs to content users in a protected fashion, as is well known. Typically, when a user goes through an activation process, some information is exchanged between activation server 20 and client environment 30, and client component 60 is downloaded and installed in client environment 30. Client component 60 serves as a security component and preferably is tamper resistant and contains the set of public and private keys issued by activation server 20 as well as other components such as any necessary engine for parsing or rendering protected content 42.

Rights label 40 is associated with protected content 42 and specifies usage rights that are available to an end-user when corresponding conditions are satisfied. License Server 50 manages the encryption keys and issues licenses 52 for exercise of usage rights in the manner set forth below. Licenses 52 embody the actual granting of usage rights to an end user based on usage rights selected from rights label 40. For example, rights label 40 may include usage rights for viewing protected 42 upon payment of a fee of five dollars and viewing or printing protected content 42 upon payment of a fee of ten dollars. Client component 60 interprets and enforces the usage rights that have been specified in license 52.

Figure 2:
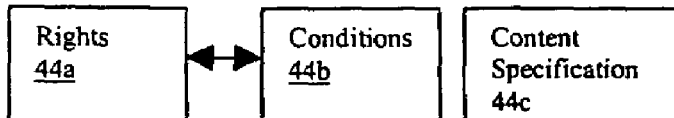
FIG. 2 is a schematic illustration of a rights label.
Figure 2:
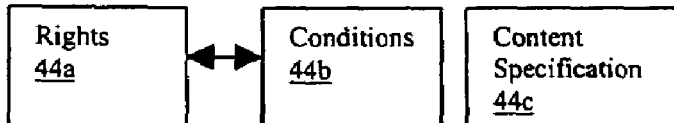
Figure 2:
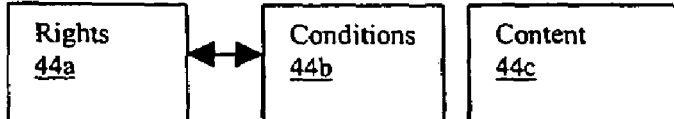

FIG. 2 illustrates rights label 40 in accordance with the preferred embodiment. Rights label 40 includes plural rights offers 44. Each rights offer 44 includes usage rights 44a, conditions 44b, and content 44c. Content specification 44c can include any mechanism for referencing, calling, locating, or otherwise specifying protected content 42 associated with rights offer 44.

Figure 3:
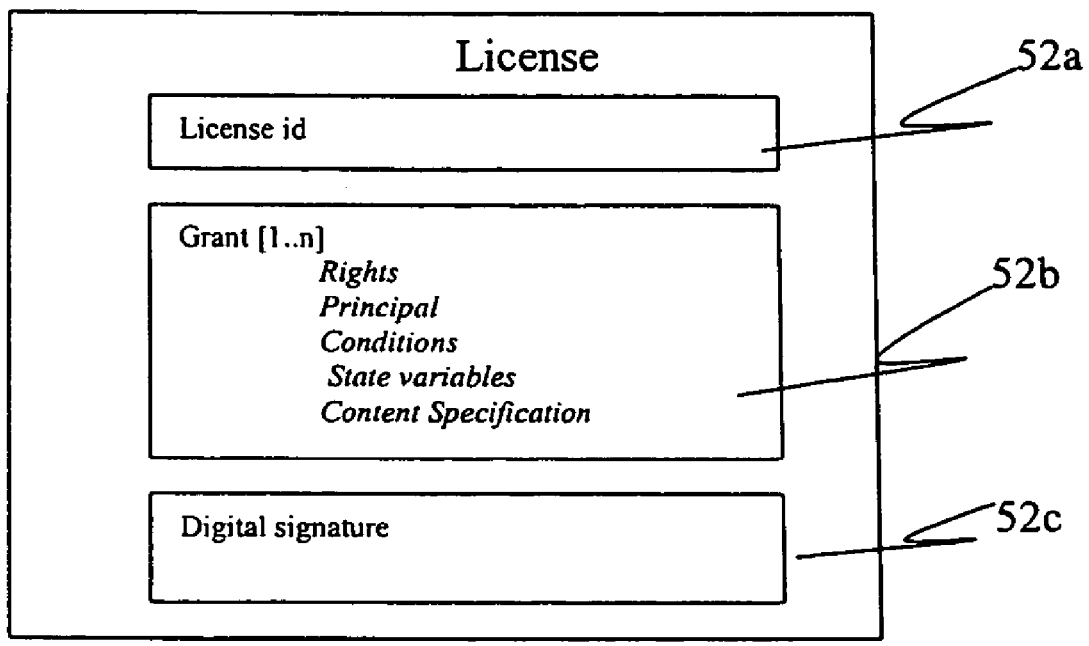
FIG. 3 is a schematic illustration of a license.

FIG. 3 illustrates license 52 in accordance with the preferred embodiment. License 52 includes a unique license ID 52a and grant 52b including usage rights, a principal, conditions, state variables, and a ticket specification designating an associated ticket 42. License 52 also includes digital signature 52c including any cryptographic keys or the like for unlocking item ticket 42.

Usage rights specify manners of use. For example, a manner of use can include the ability to use protected content 42, in a specified way, such as printing viewing, distributing, or the like. Rights can also be bundled. Further, usage rights can specify transfer rights, such as distribution rights, or other derived rights. Such usage rights are referred to as "meta-rights". Meta-rights are the rights that one has to manipulate, modify, or otherwise derive other usage rights. Meta-rights can be thought of as usage rights to usage rights. Meta-rights can include rights to offer, grant, obtain, transfer, delegate, track, surrender, exchange, and revoke usage rights to/from others. Meta-rights can include the rights to modify any of the conditions associated with other rights. For example, a meta-right may be the right to extend or reduce the scope of a particular right. A meta-right may also be the right to extend or reduce the validation period of a right.

In many cases, conditions must be satisfied in order to exercise the manner of use in a specified usage right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Usage rights and conditions can exist as separate entities or can be combined. Rights and conditions can be associated with any item including, objects, classes, categories, and services, for which use, access, distribution, or execution is to be controlled, restricted, recorded, metered, charged, or monitored in some fashion to thereby define a property right.

Protected content 42 can be prepared with document preparation application 72 installed on computer 70 associated with a content distributor, a content service provider, or any other party. Preparation of protected content 42 consists of specifying the rights and conditions under which protected content 42 can be used by associating rights label 40 with protected content 42 and protecting protected content 42 with some crypto algorithm or other mechanism for preventing processing or rendering of protected content 42. A rights language such as XrML™ can be used to specify the rights and conditions in rights label 40. However, the rights and conditions can be specified in any manner. Accordingly, the process of specifying rights refers to any process for associating rights with protected content 42. Rights label 40 associated with protected content 42 and the encryption key used to encrypt protected content 42 can be transmitted to license server 50. Protected content 42 can be a human readable or computer readable ticket, a text file, a code, a document, an audio file, a video file, a digital multimedia file, or any other content.

A typical workflow for DRM system 10 is described below. A user operating within client environment 30 is activated for receiving protected content 42 by activation server 20. This results in a public-private key pair (and some user/machine specific information) being downloaded to client environment 30 in the form of client software application 60 in a known manner. This activation process can be accomplished at any time prior to the issuing of a license.

When a user wishes to obtain a specific protected content 42, the user makes a request for protected content 42. For example, a user might browse a Web site running on Web server of vendor 80, using a browser installed in client environment 30, and request protected content 42. The user can examine rights offers 44 in rights label 40 associated with protected content 42 and select the desired usage rights. During this process, the user may go through a series of steps possibly to satisfy conditions of the usage rights including a fee transaction or other transactions (such as collection of information). When the appropriate conditions and other prerequisites, such as the collection of a fee and verification that the user has been activated, are satisfied, vendor 80 contacts license server 50 through a secure communications channel, such as a channel using a Secure Sockets Layer (SSL). License server 50 then generates license 52 for protected content 42 and vendor 80 causes both protected content 42 and license 52 to be downloaded. License 52 includes the selected usage rights and can be downloaded from license server 50 or an associated device. Protected content 42 can be downloaded from a computer associated with vendor 80, a distributor, or another party.

Application 60 in client environment 30 will then proceed to interpret license 52 and allow the use of protected content 42 based on the rights and conditions specified in license 52. The interpretation and enforcement of usage rights and related systems and techniques are well known. The steps above may take place sequentially or approximately simultaneously or in various sequential order.

DRM system 10 addresses security aspects of protected content 42. In particular, DRM system 10 may authenticate license 52 that has been issued by license server 50. One way to accomplish such authentication is for application 60 to determine if licenses 52 can be trusted. In other words, application 60 has the capability to verify and validate the cryptographic signature, or other identifying characteristic, of license 52. Of course, the example above is merely one way to effect a DRM system. For example, license 52 and protected content 42 can be distributed from different entities. Clearinghouse 90 can be used to process payment transactions and verify payment prior to issuing a license.

In DRM system 10 discussed above, end user's rights to protected content are granted to each end user through a license. However, granting licenses to a particular individual may become cumbersome to use when the protected content is to be used by a large number of individuals. For example, granting licenses to each individual of an organization can become a difficult task due to the possibly large number of employees of the organization who are end users that require access and use of the protected content. In addition, in such larger organizations, employees often change their roles within the organization, others leave the organization, or others join the organization. Any such change for end users may have associated change in authorization and access requirements to the protected content.

Monitoring records of each end user authorized to use and access the protected content, and issuing each end user a license may become a very difficult and cumbersome task for large number of individuals. Therefore, a DRM system that avoids the noted disadvantage, and facilitates issuance of a license to authorized end users is desirable.

Figure 4:
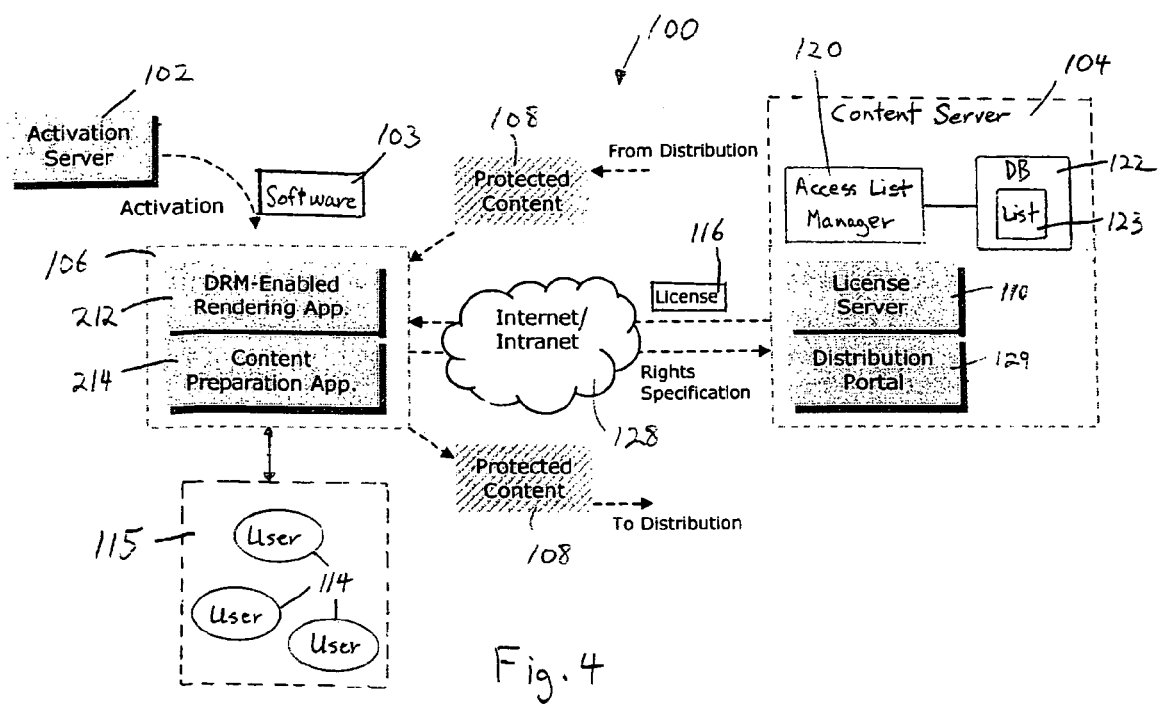
FIG. 4 is a schematic illustration of a DRM system that allows distribution of protected content to end users in a trusted community in accordance with one embodiment of the present invention.

DRM system 100 in accordance with one embodiment of present invention is illustrated in FIG. 4. DRM system 100 facilitates issuance of a license as well as monitoring and maintenance of end users 114 that are authorized to access and use protected content 108. In particular, DRM system 100 creates groups of end users in trusted community 115 described in further detail below that is associated to a particular protected content 108. An end user 114 in trusted community 115 is automatically issued license 116 required to access and use protected content 108.

It should be initially noted that whereas the terms "server" and "client" are used herein to describe the devices for implementing the present invention in the illustrated embodiments, these terms should be broadly understood to mean any appropriate device for executing the described function, such as a personal computer, hand held computer, PDA, or any other general purpose programmable computer or combination of such devices, such as a network of computers. In addition, as previously noted, "content" can be a human readable or computer readable content, a text file, a code, a document, an audio file, a video file, a digital multimedia file, or any other content.

Protected content 108 is registered with, and managed by a content device such as content server 104 in a manner described in further detail below. Because protected content 108 is encrypted, it cannot be used by end user 114 without proper license 108 and software. In this regard, DRM system 100 includes an activation device such as activation server 102 that is adapted to issue software package 103 to a user device, such as client 106, during an activation process. Software package 103 allows end user 114 to use protected content 108. Activation server 102 of DRM system 100 also provides a public and private key pair to the user device, such as client 106, each end user 114 having an identifier such as an e-mail address, a public key, or other identifier that allows recognition of end user's 114 identity.

Content device such as content server 104 of DRM system 100 also includes a license device, such as license server 110, that is adapted to issue license 116 for end user 114 having usage rights which are associated with protected content 108. License 116 defines end user's 114 rights regarding protected content 108. Requests for license 116 from license server 110 are made through network 128 such as Internet or intranet by end user 114 via client 106. Distribution portal 129 that facilitates distribution of protected content 108 and license 116 from content server 104 to end user 114 may be implemented as an application through a web site, an online store, or in another appropriate manner.

When a license device such as license server 110 issues requested license 116, distribution portal 129 conveys license 116 to end user 114. In one embodiment, license 116 can be made part of protected content 108 and delivered to end user 114 with protected content 108. However, license 116 may also be a separate file or other component with a mechanism to associate the file to the appropriate protected content 108. For example, a link, a call or other association mechanism can be used.

Client 106 receives software 103 package from activation server 102, receives protected content 108 and license 116 associated thereto from content server 104, and allows one or more end user 114 to access protected content 108 for which end user 114 is authorized.

In order to address the limitations noted previously and to facilitate issuance and management of licenses to plurality of end users 114, DRM system 100 utilizes a list of identities authorized to use protected content 108. Thus, content server 104 of DRM system 100 is provided with an access list managing device such as access list manager 120 that maintains access list 123 stored in database 122. Access list 123 is associated to protected content 108 and comprises identifications of end users 114, who are authorized to access and use protected content 108. The end users identified in access list 123 form trusted community 115 where any end user in the trusted community 115 associated to access list 123 is to be given rights to protected content 108.

In this regard, access list managing device such as access list manager 120 is also adapted to recognize the identity of each end user 114 in trusted community 115 and to compare identity of end user requesting protected content 108 with the authorized end users identified in the access list 123. When distribution portal 129 requests a license on behalf of a particular end user, for instance, end user 114 who is also identified in access list 123, access list manager 120 requests license server 110 to issue the requisite license 116 so that the requesting end user 114 can access and use protected content 108.

In the illustrated embodiment of FIG. 4, DRM system 100 can be used in the following manner. First, protected content 108 is associated with access list 123 in database 122 by access list manager 120. Access list 123 sets forth identities of end users 114 in trusted community 115 that are to be given access to protected content 108. Then, requesting end user 114 utilizes client 106 activated by server 102, to request access to protected content 108 via distribution portal 129. During the request process, a series of steps may be provided to ensure identity of end user 114 requesting access, such as logging in using an identifier such as account name and password, or any other appropriate manner.

Distribution portal 129 submits the request of end user 114 through client 106, to access list manager 120 of content server 104. Access list manager 120 compares the identity of requesting end user 114 to identities of end users in access list 123 stored in database 122 which is associated to the requested protected content 108. When access list manager 120 confirms that the identity of requesting end user 114 is present in access list 123, it requests license server 110 to issue a license 116 to allow end user 114 to access protected content 108. If identity of an end user requesting access to protected content 108 is not in access list 123, this means that the end user requesting access is not part of trusted community 115, and thus, should not be given access to protected content 108. Consequently, no request for a license is sent to license server 110 in such an instance thereby preventing the unauthorized end user from gaining access to protected content 108.

The request for licenses may be executed using an API or by any other appropriate mechanism or protocol. Upon receiving the request to issue license 116, license server 110 then issues license 116, and delivers license 116 to distribution portal 129 for delivery to end user 114 that requested access. License 116 is delivered to client 106 so that end user 114 can readily access and use protected content 108. In this regard, client 106 includes rendering application 212 that allows protected content 108 to be used or otherwise consumed by authorized end user 114, i.e. an end user that is granted license 116. Rendering application 212 would typically be received by client 106 from activation server 102 during the activation process with software 103. Rendering application 212 may be a word processing document if protected content 108 is a document, a multimedia player if protected content 108 is a multimedia file, and so forth.

As also shown in the embodiment of FIG. 4, client 106 of DRM system 100 includes content preparation application 214 that allows administrators in control of DRM system 100 to generate protected content such as protected content 108 from unprotected clear content in the manner previously described relative to FIG. 1. In particular, content preparation application 214 allows various rights for a particular content to be specified and content to be encrypted. The generated protected content may then registered with content server 104 where protected content is uploaded to content server 104 and associated to access list 123 by access list manager 120 in the manner previously described. As previously noted, various information may be required to register protected content 108 into content server 104. In one implementation, administrators that create protected content may be required to have a valid account with content server 104 in order to register content therein. Moreover, as also previously noted, various information regarding the content, and e-mail address of administrators that registered content into content server 104 may also be required.

Figure 8:
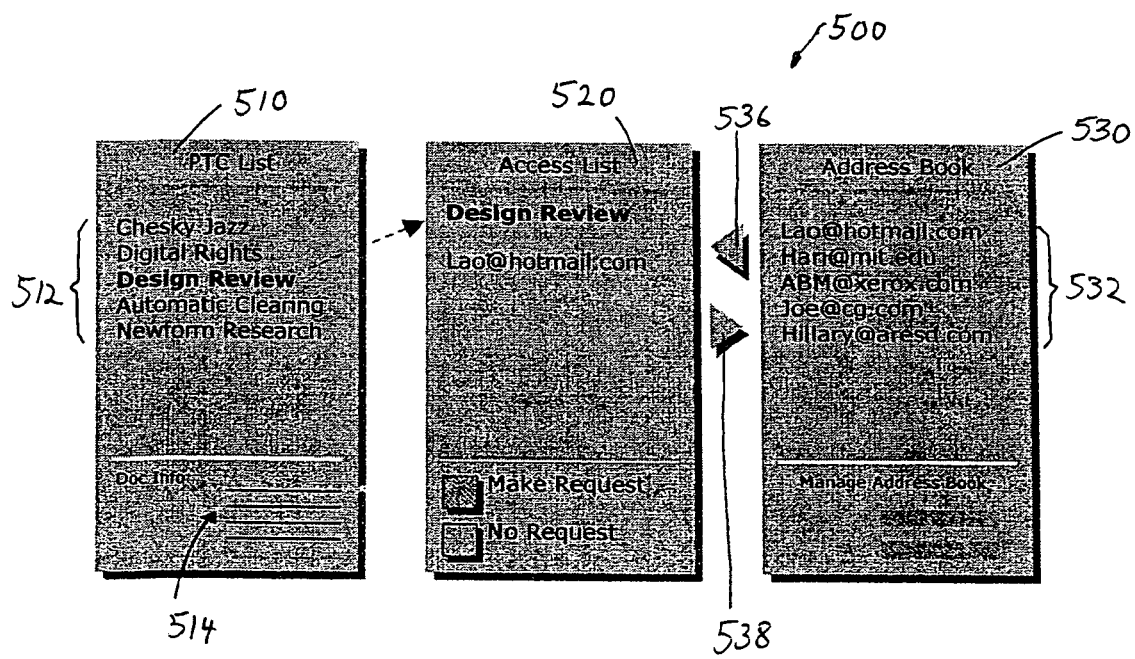
FIG. 8 illustrates sample graphic user interface screens for management of access list in accordance with another example implementation.

A significant advantage of DRM system 100 in accordance with the illustrated embodiment is that it allows administrators of organizations and/or DRM system 100 to maintain access list 123 so that end users can readily be added to or deleted from trusted community 115, one method being described in further detail below and also relative to FIG. 8. Therefore, for example, as employees of a company move departments or leave the company, their respective membership in any given trusted community can also readily be changed. In addition, automation of license issuance is facilitated since the decision to issue license 116 may be substantially automated using access list manager 120 that verifies presence of end user's identification in access list 123.

It should be noted that in the above discussed DRM system 100 of FIG. 4, only one protected content 108 was discussed for example purposes only. In actual implementation, DRM system 100 may be used to manage numerous protected content that are registered into content server 104. Each of the registered protected content would then be associated with an access list stored in database 122 and managed by access list manager 120. Whereas the illustrated embodiments show access list manager 120 as a component of content server 104 that substantially automates management of access list 123, it should be noted that human oversight and control may be used as desired, for instance, by an administrator for client server 104. In other embodiments, functions of access list manager 120 may be manually performed by an administrator or the like.

Registration of all protected content into content server 104 may require provision of various information regarding each protected content, and may also optionally require entry of an e-mail address of the creator of each protected content. As discussed above, access to each of the registered protected content is determined by whether or not the end user requesting access to the protected content is part of the trusted community associated to the protected content. Content server 104 may also be provided with ancillary features that allow administrative facilities to view, edit, delete and update rights labels associated with each of the protected content.

Moreover, it should also be noted that in the above discussed DRM system 100 of FIG. 4, access list 123 stored in database 122 and managed by access list manager 120 was associated with only one protected content 108 for example purposes only. In actual implementation, access list 123 that defines trusted community 115 may be associated to one or more protected content. This is especially advantageous in the instance where same group or groups of end users are to be given access to a plurality of protected content. Thus, DRM system 100 may be used to manage numerous protected content that is registered into content server 104, and to manage access lists that are associated with one or more protected content.

In addition, as previously noted, distribution portal 129, which is merely schematically shown in FIG. 4, may be a computer application or a storefront such as a web based, on-line store or vendor. In other embodiments however, distribution portal 129 may be a computer application that is integrated with a mail server, license server 110, or content server 104.

Maintenance of access list 123 in database 122 by access list manager 120 could be as simple as storing e-mail addresses, cookies, or public keys associated with the end user 114. Such embodiments are especially advantageous in an enterprise such as a organization, company or entity, where content server 104 may be implemented using e-mail addresses as identities of end users so that various distribution lists that are likely to already be present and used in the organization may be considered or be adapted for use as access list 123 by associating it to protected content 108. In the above manner, DRM system 100 in accordance with the present invention facilitates issuance of a license to access and use a protected content, and also facilitates monitoring and maintenance of those end users that are to have such access.

Figure 5:
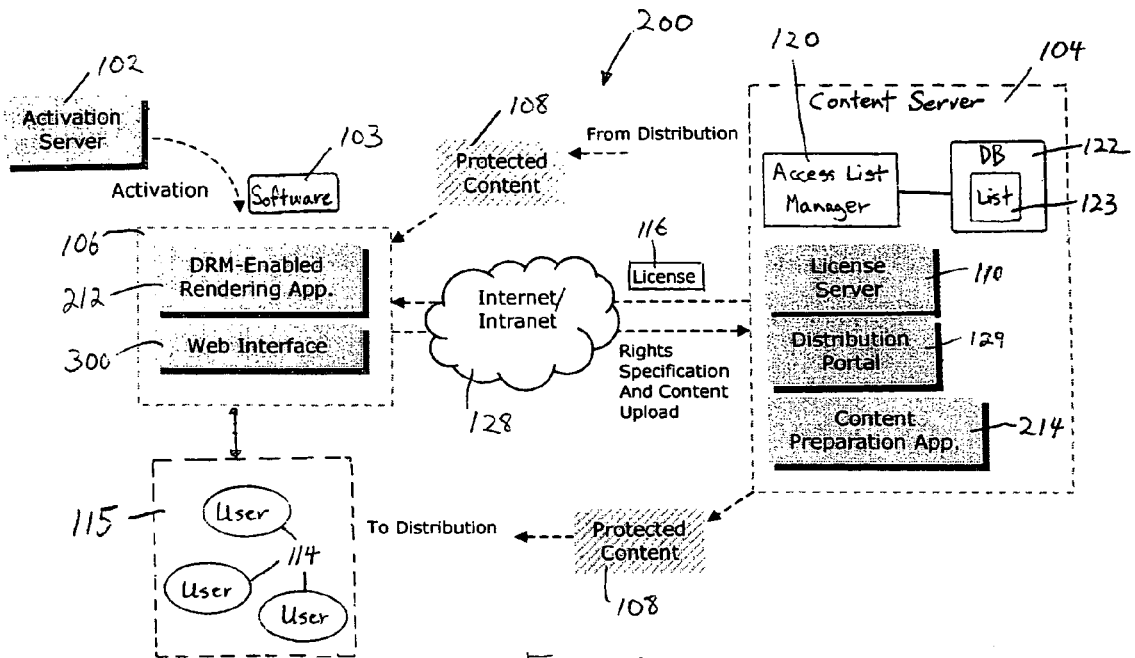
FIG. 5 is a schematic illustration of a DRM system in accordance with another embodiment of the present invention.

FIG. 5 is schematic illustration a DRM system 200 in accordance with an alternative embodiment of the present invention. As shown, this embodiment is substantially similar to applications shown in FIG. 4 discussed above. Consequently, common numerals have been used for common components. In contrast to DRM system 100, in DRM system 200 of FIG. 5, content preparation application 214 is provided as a component of content server 104 and provides protected content 108 for distribution as shown. In this regard, it should be noted that in the above embodiments, the physical locale of various components is not important as long as their functions are retained, especially since network 128 allows transfer of data and instructions between the various applications and devices. In this regard, in the implementation of FIG. 5, client 106 is also provided with web interface 300 that facilitates such transfer of data and instructions between content server 104 and client 106 via network 128. Thus, various embodiments of DRM system of the present invention such as those shown in FIGS. 4 and 5 are merely examples of how the present invention may be implemented.

Figure 6:
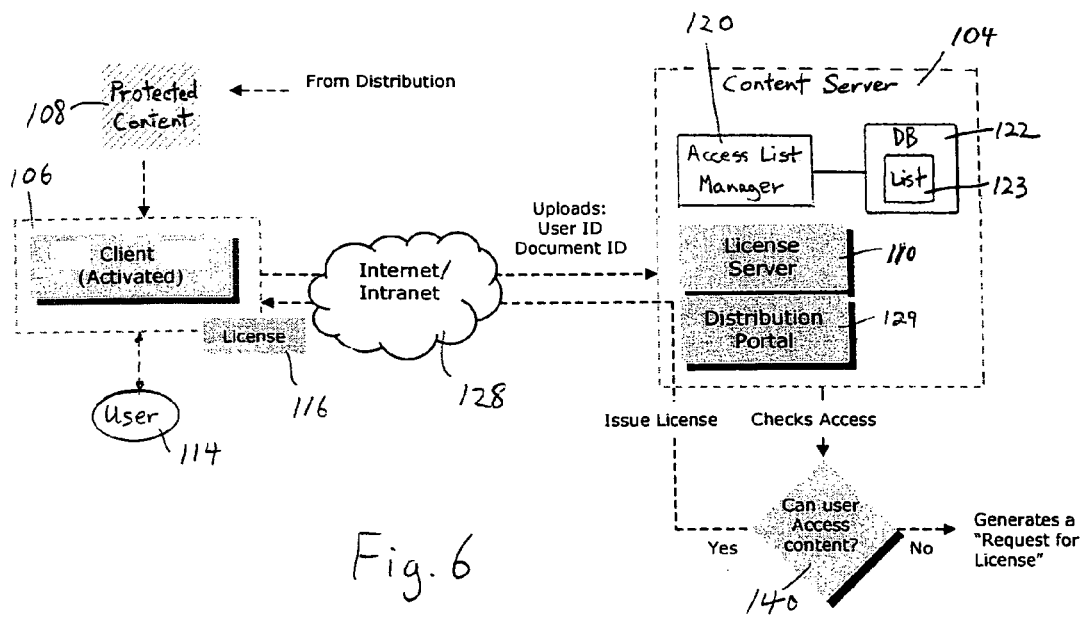
FIG. 6 is a schematic illustration showing the generation of a license.

FIG. 6 is a schematic illustration showing generation of license 116 in DRM system 100 of the preferred embodiment, the process and operation of the DRM system being discussed in detail below. Only the components required to generate license 116 has been shown for clarity purposes, but other ancillary components of DRM system 100 of FIG. 4 are referenced. Therefore, both FIG. 6 and FIG. 4 should be referenced to better understand license generation in DRM system 100 in accordance with the illustrated embodiment.

End user 114 receives protected content 108 through an e-mail, or other distribution mechanism without license 116 that is required to use or consume protected content 108. End user 114 attempts to open protected content 108. Client 106 detects that there is no license and extracts an identifier for protected content 108 that identifies protected content 108, for instance, content ID number. Such an identifier is preferably provided as metadata in protected content 108, for instance, by using content preparation application 214 when clear content is made into protected content 108. Client 106 automatically connects to content server 104 via network 128 and uploads identity of end user 114 such as the user's e-mail address into content server 104, as well as extracted content ID number associated with protected content 108.

The following metadata may be added to protected content 108 during its creation by content preparation application 214:

Content identifier: a unique ID for the content.
Publisher or creator identifier: a unique ID for the publisher or creator of the content.
Secondary content identifier: A number assigned by the publisher or storefront. This typically is a catalog ID that is used by distribution point. This number is associated with content identifier.
Content server URL: A URL where licenses are obtained through license server.
Services URL: A URL that a "services" button (described below) connects to when services button is pressed.

The above is merely an example of the metadata components that may be provided. However, not all of the metadata need be captured for all protected content and the system can be designed to capture other metadata in other embodiments. For example, secondary identifiers or identity of the publisher or creator may not be required. In addition, services button feature need not be provided in certain embodiments. Moreover, whereas in the above examples, an on-line implementation was used so that URLs are provided in the metadata, in off line implementations or closed systems, URLs would not be applicable and other types of pointers may be used.

Content server 104, through access list manager 120, checks access list 123 associated with identified protected content 108 to determine whether end user 114 is in trusted community 115 associated with protected content 108 and whether end user 114 is to access protected content 108 in decision block 140. If content server 104 identifies end user 114 as being in trusted community 115, i.e. on access list 123, content server 104 requests license server 110 to issue license 116 to end user 114. If end user 114 is not a member of the trusted community, then depending on policies followed by content server 104 and DRM system 100, a request for permission can be made, for instance, via a "services" button described further below.

It should also be noted that protected content 108 that end user 114 is given access to, does not have to be digital content itself, e.g. a multimedia file. Instead, protected content 108 may be a means to obtain the actual digital content, for instance, a hyper link to such digital content that is available by download. It is also possible to reverse the above described process so that end user 114 first obtains license 116 and then, obtains protected content 108. The downloading or otherwise obtaining of protected content 108 may occur at any appropriate time.

In this regard, content server 104 may be implemented with the ability to specify a "License Request Policy" which determines how DRM system 100 handles a request to generate a license made by users that are not currently part of the access list, i.e. not in trusted community. When the requesting end user does not belong to access list 123 for protected content 108, license 116 is not automatically generated. Instead DRM system 100 generates a exception and the request is handled according to the License Request Policy which can be set to: "No Request" or "Make Request".

A "No Request" policy means that the end user, if not part of the trusted community, will automatically be denied access to the content. An error message may be shown to the requesting end user indicating that "the user is not authorized to use content".

A "Make Request" policy means that when an end user attempts to use content 108 and the end user is not part of the trusted community, a request to the author of the content or administrator of content server 104 is made and an information box is presented to the requesting user indicating that user can make a request to use protected content. Content server 104 communicates the request to access list manager 120, for example, by sending an e-mail to an administrator who is in charge of managing access list manager 120 or accounts associated with each registered protected content. The request is entered in the "license request disposition" facility of content server 104 where access list manager 120 is used to either grant or deny the request for license 116.

More specifically, when access list manager 120 receives the notification, it proceeds to process the requests. In an implementation where access list manager 120 is designed for intervention by an administrator, notification may be via e-mail with instructions and URL, so that the administrator can log into records of content server 104. The administrator can then proceed to the "license request disposition" facility to process any one or all of the outstanding requests. For each request, the access list manager 120 would either "grant" or "deny" the request.

Figure 7:
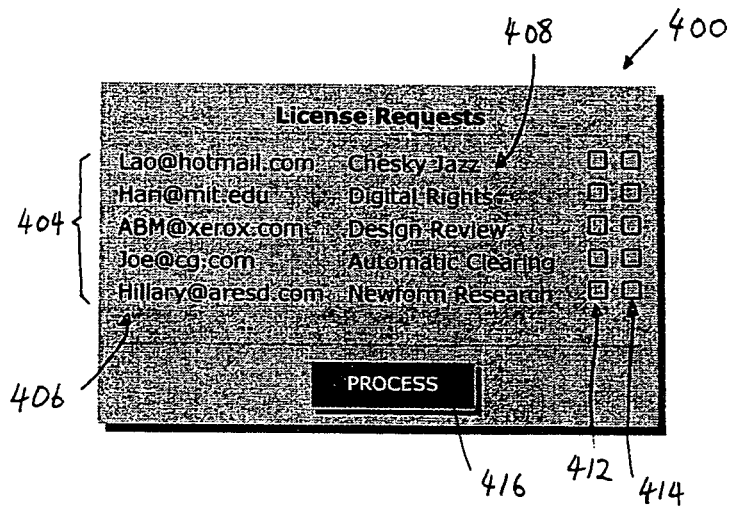
FIG. 7 is a graphic user interface screen for license requests in accordance with one example implementation.

One embodiment of user interface 400 that may be used to present and process the request is shown in FIG. 7 for an implementation where access list manager 120 is designed for intervention by an administrator. User interface 400 lists each request 404 that describes identifies the requester via e-mail addresses 406 and the requested content 408. First column of check boxes 412 may be selected by the administrator to grant the request while second column of check boxes 414 is selected by the administrator to deny the request. Alternatively, the administrator could make a "counter offer" to the requester such as by offering to provide access under certain conditions, for instance, payment of a fee. After all the outstanding requests 404 have been reviewed, the administrator can process them by clicking on a "process" button 416.

Of course, in other embodiments, the above noted process may largely be automated where access list manager 120 determines whether to grant or deny the request based on various predetermined parameters, for example, current demand for the requested protected content. Moreover, the request may be conditionally granted, for example, based on action of the requesting end user such as payment of a fee.

If the request is denied, the content server 104 can communicate with the requesting end user, for example, by sending an e-mail with a message indicating that the request has been denied and that the end user is not authorized to use protected content 108 requested. If the request is granted, access list manager 120 of content server 104 adds the requesting end user to access list 123 associated with protected content 108. The license server 110 would then issue license 116. In addition, the end user may be instructed to open and render the protected content. Alternatively, the communication could be dispensed with and the content automatically opened/rendered. In the preferred embodiment, the end user is not automatically added to address book 530 discussed below relative to FIG. 8 because the assumption is that the end user is granted access only for that particular request. Of course, DRM system 100 could be implemented to change that assumption. In any event, access list manager 120 can add/delete the requester to/from, address book 530, manually or automatically, based on pre-defined rules.

In other embodiments, features may be provided to allow specifying of parameters upon which a "request" or "no request" decision is made. For example, DRM system 100 could be implemented to make requests during business hours or periods of low demand and to make no request at other times.

As previously discussed, access list manager 120 manages access list 123 stored in database 122 that is associated with protected content 108. In this regard, it was further noted that plurality of protected content is managed by access list manager 120. FIG. 8 illustrates an example graphical user interface 500 demonstrating a sample data structure that may be used to manage the plurality of protected content. An administrator overseeing operation of access list manager 120 may access the illustrated graphical user interface 500 by logging into content server 104, and selecting the "Manage Access List" function button.

This button launches the illustrated windows with headings "PTC List" 510, "Access List" 520, and "Address Book" 530. PTC List window 510 lists protected contents 512 managed by access list manager 120 of content server 104, and more specifically, PTC List window 510 is a listing of all protected content in DRM system 100 for which there are rights labels. In this regard, PTC List window 510 is somewhat like a catalog and entries to this list are automatically added whenever a new protected content is registered into content server 104. It should be noted however, that PTC List window 510 is not a catalog that can be accessed by end users or any particular end user. The purpose of this list is to provide a mechanism for the content creator or administrator to manage access lists associated to each protected content and to aid in performance of other administrative tasks.

Once a protected content in PTC List window 510 is selected, for instance, content entitled "Design Review", various information regarding the selected protected content is shown in section 514 of PTC List 510 such as metadata and rights associated with the particular protected content. An alternative implementation is to have the administrator click on a button such as a "show details" button before the details are shown.

In addition, Access List window 520 that is associated with the protected content "Design Review" is shown. As discussed previously, whenever a protected content is created, an access list associated thereto is created. If the creator of the protected content or administrator does not put any entries in the access list, the access list would be "empty". Empty access lists which may be specially indicated in PCT List window 510. In the illustrated example, only one end user identified by e-mail address "Lao@hotmail.com" is listed in Access List window 520.

In addition, Address Book window 530 is also displayed which may be used to add/delete end users to the access list for the displayed protected content, namely for "Design Review" in the illustrated example. As shown, Address Book window 530 lists various end users 532 that may be added to Access List window 520 by selecting the desired end user in Address Book window 530, and clicking add arrow 536. Likewise, an end user already listed in Access List window 520 may be removed by selecting the desired end user in Access List window 520 and clicking remove arrow 538.

The address books supports the customary elements for an address book such as individuals and distribution lists. In this regard, entries in Address Book window 530 may be existing distribution lists within an organization, derived from such distribution lists, or individual entries for individuals. In addition, the address book supports "wild-card" entries such as "everyone@contentguard.com" or "@contentguard.com" if, for example, an access list is to allow access to a protected content to everyone within a domain. Entries in Address Book window 530 can be manually created or imported to the DRM system through customary means such as LDAP directory services, CSV files, etc. In the above described manner, the administrator may add/ delete end users from the trusted community by adding/deleting end users from the access list.

In addition to the above described features, DRM systems in accordance with the present invention may also be provided with other ancillary features as well. One optional feature which may be implemented via DRM system 100 of FIG. 4 is a "services button" that establishes a connection between various parties privy to DRM system 100 to facilitate communication or other function. Services button may be used for any function or service specified by DRM system's design. For example, services button may connect client application 210 to a web server and pass information to server application 220 based on end user's activity. Specifically, when services button is clicked, client 106 tries to connect to a URL that is specified in the currently active, opened protected content. This URL could lead to any service such as an on-line store offering related content for sale, or a connection to a users group discussing a similar or related topic.

When the services button is clicked, but no services URL is found in the content currently active, a message acknowledging the use of the services button may be presented which states that for the particular content, creator of the protected content has not offered any additional services. The DRM system 100 may be designed so that the services button appears only when a protected content is active so that if there are no protected contents opened, the services button disappears.

The above example was an on-line system using URLs. This would be a typical embodiment involving commerce over network 128 such as the Internet. The principles work with an off-line or closed system as well. In such closed systems, one can access additional services within a single enterprise and without connecting to the Internet, or without going on-line at all.

In another embodiment, a "Connect to Community" feature may be provided by content server 104 that allows the administrator or other individuals to electronically contact members of trusted community 115 thereby facilitating communication. The administrator or content creator may want to send an electronic note to all the listed end users 114 of a particular protected content 108 that form trusted community 115, for example, to indicate that a new version of protected content 108 is available, or just to start some discussion regarding protected content 108. This feature may be implemented by GUI that allows selection of one or more members of access list 123, or selecting the entire access list 123 by sending the message to the associated protected content 108, and merely clicking a button marked "send message". A mail form may be launched so that the administrator can create a note addressed to the appropriate party. By actuating "send", the administrator sends the created note to the indicated parties.

Another example of use for the services button is in providing a "Connect to Author" function in which an end user using a protected content wishes to send an e-mail to the author/creator of protected content 108 via content server 104. End user 114 clicks on the services button which connects end user 114 to content server 104 and presents an e-mail form or web page which end user 114 can use to send a message to the author of the protected content 108. A typical design would launch the mail form/web page in a separate window so end user 114 may still access protected content 108 while writing the message. End user's identity and protected content ID may be sent to content server 104 so that content server 104 can automatically populate the "from" field and the "subject" field of the mail form. User enters a message and clicks "send". The e-mail of the author may, or may not, be shown for privacy reasons, etc. Of course, related features such as "send a copy to yourself" may be provided as well. After the message is sent, the content server 104 would close the mail form. In order to provide the described "Connect to Author" function, input of the e-mail address of the creator of the protected content 108 would be required during its registration into content server 104.

DRM system 100 in accordance with another embodiment may also be adapted to provide further protection for access to protected content 108 where client 106 includes a protection application, or alternatively, where the protected application is hosted by content server 104 and accessed over network 128 such as the Internet. In one embodiment, the protection application, whether as a local application, or as a web-based application hosted in content server 104, supports a graphic user interface/workflow that requires login with password authentication.

In addition, in another embodiment, distribution of protected content may be preferably designated by the author/creator of the protected content or an administrator who otherwise controls the protected content to further ensure security for accessing protected content 108. Protected content 108 may be designated to be protected and downloaded as a protected file so that the creator or administrator may distribute the protected content through e-mail, or place the protected content in some existing repository, for instance, clearinghouse 90 discussed above relative to FIG. 1. Alternatively, the creator or administrator may also designate that protected content 108 be "published" to a document portal served by content server 104, in which case, additional metadata would be desirable, for example, an abstract of the content.

In another embodiment, content server 104 may be provided with reporting functions for reporting general statistics such as number of licenses generated by license server 110, number of protected contents that are registered, etc. Content server 104 may also have features for reporting specific statistics such as number of licenses issued per specific protected content, all licenses issued with the associated content identifier and/or the end user identifier, licenses for each protected content, etc. Other general statistics may also be reported including number of request received, number of requests granted, number of requests denied, and time to process a request such as average, mean, maximum and minimum time required.

Therefore, in view of the above, content server 104 and other components of DRM system 100 as shown in FIG. 4 enable the end-to-end workflow where many functions are attained to provide a portal for consuming protected content 108. In the above discussed manner, DRM system 100 acts to manage rights labels; generate, process and dispose of licenses; manage protected content; provide address book functionality; manage access lists; provide reporting features; provide services button to allow communication; facilitate communication; and account management. Of course, in still other embodiments, other ancillary features may be provided as well.

Furthermore, it should again be understood that whereas the terms "server" and "client" are is used to describe the devices for implementing the present invention in the illustrated embodiments above, these terns should be broadly understood to mean any appropriate device for executing the described function, such as a personal computer, hand held computer, PDA, or any other general purpose programmable computer or combination of such devices, such as a network of computers. Communication between the various devices can be accomplished through any channel, such as a local area network (LAN), the Internet, serial communications ports, and the like. The communications channels can use wireless technology, such as radio frequency or infra-red technology. The various elements of the preferred embodiment such as the various devices and components are segregated by function for the purpose of clarity. However, the various elements can be combined into one device or segregated in a different manner. For example, the software package and/or licenses can be a single executable file and data files, or plural files or modules stored on the same device or on different devices. The software package can include any mechanism for enforcing security and need not include a rendering application or the like.

Any protocols, data types, or data structures can be used in accordance with the invention. Moreover, any appropriate means of expressing usage rights and conditions may be used in implementing the present invention. For instance, as previously noted, a rights language grammar such as XrML™ or any other appropriate grammar can be used. In addition, software using objects or an object-oriented software development environment may be used that provides portable source code that can be used on a variety of computer hardware platforms. For example, the software used in implementation of the present invention can be written in the JAVA language and run in a JAVA virtual machine. Alternatively, the disclosed operations may be implemented partially or fully in a hardware using standard logic circuits or VLSI designs. The hardware can include any type of general purpose computer, dedicated computer, or other devices.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications as defined by the appended claims and legal equivalents.

We claim:

1. A rights management system for managing use of items having usage rights associated therewith by enforcement of the usage rights with repositories, the system comprising:
   a client device adapted to request an item and receive the item and a license including a usage right associated with the item and specifying a permitted manner of use of the item; and
   a server device adapted to send the item and the associated usage right to the client device in response to the request;
   wherein the client device includes means for establishing a communication between the client device and a third party entity associated with the rights management system based on a received item and associated usage right,
   the means for establishing a communication establishes a communication between the client device and the third party entity comprising a web server associated with the rights management system,
   the means for establishing passes information to the server device based on activity of the client device at the web server, and
   an address for establishing a communication between the client device and the web server associated with the rights management system is specified by the associated usage right.

2. The system of claim 1, wherein the means for establishing a communication includes a button that when clicked establishes a communication between the client device and the web server associated with the rights management system.

3. The system of claim 1, wherein the web server includes one of a service, an on-line store, and a user group.

4. The system of claim 1, wherein the server device is further adapted to generate the license for the item and including the associated usage right, and to include a reporting function for reporting statistics.

5. The system of claim 4, wherein the statistics include general statistics including at least one of a number of licenses generated by the server device, a number of items that are registered with the server device, a number of requests received for an item, a number of requests granted for an item, a number of requests denied for an item, and a time to process a request for an item.

6. The system of claim 5, wherein the time to process a request for an item includes at least one of an average time to process a request for an item, a mean time to process a request for an item, a maximum to process a request for an item, and a minimum time to process a request for an item.

7. The system of claim 4, wherein the statistics include specific statistics including at least one of a number of licenses issued for a specific item, a number of licenses issued with a specific content identifier, a number of licenses issued with a specific end user identifier, and a number of licenses issued for each item.

8. A method of rights management for use in a system for managing use of items having usage rights associated therewith by enforcement of the usage rights with repositories, the method comprising:
   requesting via a client device an item;
   receiving the item and a license including a usage right associated with the item and specifying a permitted manner of use of the item;
   sending via a server device the item and the associated usage right to the client device in response to the request; and
   establishing via means within the client device a communication between the client device and a third party entity associated with the rights management system based on a received item and associated usage right,
   wherein the establishing step includes establishes a communication between the client device and the third party entity comprising a web server associated with the rights management system,
   the establishing step includes passing information to the server device based on activity of the client device at the web server, and
   an address for establishing a communication between the client device and the web server associated with the rights management system is specified by the associated usage right.

9. The method of claim 8, wherein the establishing step includes providing a button that when clicked establishes a communication between the client device and the web server associated with the rights management system.

10. The method of claim 8, wherein the web server includes one of a service, an on-line store, and a user group.

11. The method of claim 8, further comprising generating via the server device the license for the item and including the associated usage right, and to include a reporting function for reporting statistics.

12. The method of claim 11, wherein the statistics include general statistics including at least one of a number of licenses generated by the server device, a number of items that are registered with the server device, a number of requests received for an item, a number of requests granted for an item, a number of requests denied for an item, and a time to process a request for an item.

13. The method of claim 12, wherein the time to process a request for an item includes at least one of an average time to process a request for an item, a mean time to process a request for an item, a maximum to process a request for an item, and a minimum time to process a request for an item.

14. The method of claim 11, wherein the statistics include specific statistics including at least one of a number of licenses issued for a specific item, a number of licenses issued with a specific content identifier, a number of licenses issued with a specific end user identifier, and a number of licenses issued for each item.

15. A device for use in a rights management system for managing use of items having usage rights associated therewith by enforcement of the usage rights with repositories, the device comprising:
    means for requesting an item and receiving the item and a license including a usage right associated with the item and specifying a permitted manner of use of the item, wherein a server device is adapted to send the item and the associated usage right in response to the request; and
    means for establishing a communication with a third party entity associated with the rights management system based on a received item and associated usage right,
    wherein the means for establishing a communication establishes a communication between the client device and the third party entity comprising a web server associated with the rights management system,
    the means for establishing passes information to the server device based on activity of the client device at the web server, and
    an address for establishing a communication between the client device and the web server associated with the rights management system is specified by the associated usage right.

16. The device of claim 15, wherein the means for establishing a communication includes a button that when clicked establishes a communication between the client device and the web server associated with the rights management system.

17. The device of claim 15, wherein the web server includes one of a service, an on-line store, and a user group.

18. The device of claim 15, wherein the server device is further adapted to generate the license for the item and including the associated usage right, and to include a reporting function for reporting statistics.

19. The device of claim 18, wherein the statistics include general statistics including at least one of a number of licenses generated by the server device, a number of items that are registered with the server device, a number of requests received for an item, a number of requests granted for an item, a number of requests denied for an item, and a time to process a request for an item.

20. The device of claim 19, wherein the time to process a request for an item includes at least one of an average time to process a request for an item, a mean time to process a request for an item, a maximum to process a request for an item, and a minimum time to process a request for an item.

21. The device of claim 18, wherein the statistics include specific statistics including at least one of a number of licenses issued for a specific item, a number of licenses issued with a specific content identifier, a number of licenses issued with a specific end user identifier, and a number of licenses issued for each item.

* * * * *